F. O. WENELL.
Seed-Planter.

No. 167,206.

Patented Aug. 31, 1875.

Witnesses
Thos. H. Hutchins
A. F. Patrick

Inventor
Frank O. Wenell

UNITED STATES PATENT OFFICE.

FRANK O. WENELL, OF PLAINFIELD, ILLINOIS.

IMPROVEMENT IN SEED-PLANTERS.

Specification forming part of Letters Patent No. 167,206, dated August 31, 1875; application filed February 16, 1875.

*To all whom it may concern:*

Be it known that I, FRANK O. WENELL, of Plainfield, in Will county and State of Illinois, have invented certain Improvements in Seed-Planters, of which the following is a specification:

The improvements I claim to have made are for the purpose of enabling the machine to plant without the necessity of check-rowing the field, and to either plant as a drill or in hills, as desired, the construction and operation of which I will proceed to explain, reference being had to the annexed drawings, in which—

Figure 1:
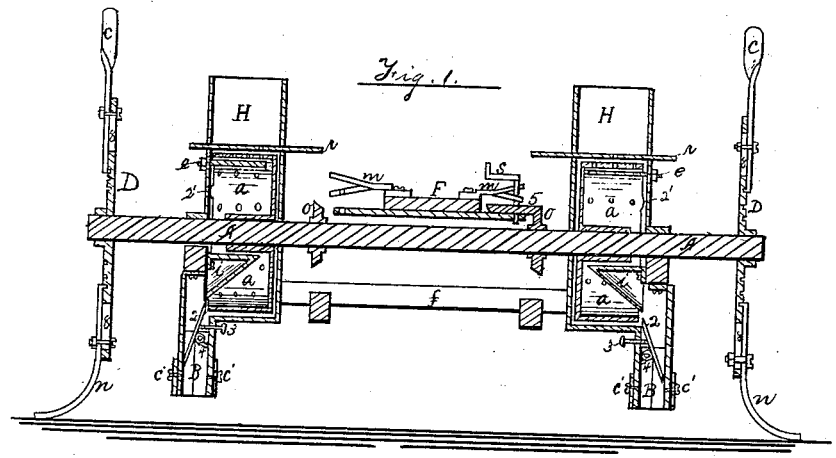
Figure 2:
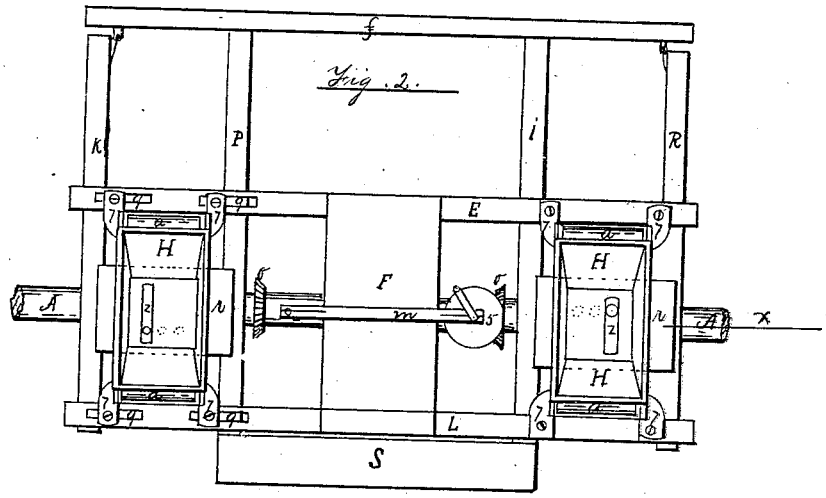
Figures 3, 4, 5:
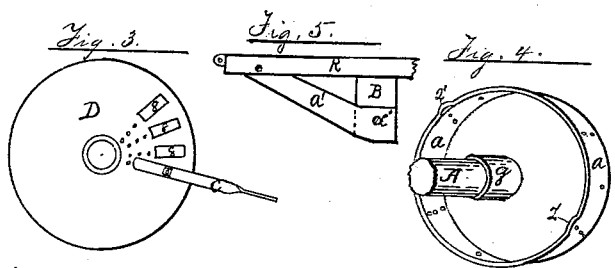

Figure 1 is a vertical detail sectional view, looking toward the front on the line $x$, Fig. 2; Fig. 2, a plan view on the top; Fig. 3, an elevation of one of the traveling-wheels; Fig. 4, a perspective view of the dropping-cylinder and part of the axle, and Fig. 5 a side elevation of one of the shoes.

In the drawings, A is the main axle or shaft, which bears the frame of the machine $f$ K P I R E L, which supports and carries the working parts hereinafter described. D are the two traveling-wheels, which carry the weight of the machine while engaged in planting. These traveling-wheels D are provided with radial slots 8 all the way around. These slots 8 receive a small bolt, which holds on the spokes or arms $c$, particularly shown in Figs. 1 and 3. The spokes $c$ are twisted at their outer ends, so as to form sort of spades, which, when in the earth, have a greater tendency to prevent the slipping of the wheels D on the surface of the ground. $n$ $n$ are bent spokes made of some kind of spring metal, and are intended, as the wheel rolls, to strike on the surface of the ground and leave a mark, so that the operator may, on his return, set the machine so this bent spoke will strike opposite to the mark it made before in crossing the field. It is calculated the machine will drop every time one of these spring-spokes strikes the ground, so the row will come exactly opposite that theretofore planted, thus obviating the necessity of check-rowing the ground in advance. These spokes may be of any number; generally two are used, one opposite to the other. The spokes $n$ and $c$ may be set so as to be longer or shorter by means of the slot 8 and the row of holes in the disk of the wheel D, between the hub and the slots which receive the bent ends of the spokes, as shown. $a$ represents the dropping-cylinders, which are attached permanently to the axle A by a sleeve or hub, $g$, Fig. 4, having the open side toward the outer ends of the machine. The rim or flange of the dropping-cylinder $a$ is perforated with small holes of various sizes, to compare with the size and kind of grain to be dropped through them, and the cylinder revolves with the axle A in the hopper H. (Shown particularly in Fig. 1.) $r$ is a slide passing through the hopper, and is provided with a slot or hole, $z$, so arranged that the slot may be placed over any row of holes in the cylinder $a$. $e$ is a guard attached to the inner side of the hopper H, as shown in Fig. 1, directly under the flange of the cylinder $a$, and under the slot $z$ in the slide $r$, so as to prevent the grain from running through the holes in the flange of the dropping-cylinder in a stream while the hole is passing through under the length of the slot $z$. As the grain drops into the holes in the flange of the dropping-cylinder $a$ it is carried forward until it drops off the guard $e$ and falls down into the chute $i$, which catch it and carry it forward, so it will drop finally into the shoe B, where it enters the earth.

When it is desired to drill in the grain the set-screw 3 is turned up so as to open the valve 2 in the shoe B, so the grain will not be caught and held by the valve 2, but will drop immediately into the ground from the chute $i$; but when it is desirable to drop the grain in hills the set-screw 3 is turned back so the valve 2 will close the shoe B, as shown in Fig. 1, and the grain will be caught and held between the lower end of the valve 2 and the walls of the shoe B until it is released by means of the little projection 2' on the edge of the flange of the dropping-cylinder $a$, (shown in Figs. 1 and 4,) which, in their revolutions, engage with the upper end of the valve 2, which will cause it to open at the bottom and let the grain drop out. It is calculated that the bent spokes $n$ and the projection 2' will be opposite to each other, so the grain will drop just as the spoke $n$ strikes the ground. 4 is a coil-spring, which serves to hold the valve 2 in the position shown in the drawings, and make it close after the projection 2' has let loose.

Fig. 5 shows the shape of the runner, it being long and a very gradual incline, so as to more easily run over clods rather than shove them forward. The knife part of the shoe a' may be set up and down on the shoe B by means of the screws c' at the side, (shown in Figs. 1 and 5,) so the machine will rest with more or less weight on the shoe, as may be desired. F is a seat, on which the operator may ride to operate the machine.

In case it should be seen that the machine is not dropping opposite the row previously dropped, having gained or lost, the operator may take hold of the crank S of the gear o 5, and by turning it one way or the other may retard or accelerate the speed of the traveling-wheels, so they will cause the marking-spoke n to strike the ground opposite to the row previously dropped, and all without the necessity of stopping the machine to put it in position. If it is desired to regulate the distance apart the machine will drop the grain, that may be done by means of moving one of the dropping-cylinders with its hopper nearer or farther from the other, by means of the slots 9 and bolts passing through, which hold the feet 7 of the hoppers H, Fig. 2.

It is calculated that the grain will be covered after it is dropped by means of the ordinary traveling-wheels attached to the frame in the rear of the shoe, as in any other machine, which I do not show, not being any part of my invention.

Having thus described my invention, what I claim as new, and desire to secure by Letters Patent, is as follows:

The bevel-gear o 5 and crank s, in combination with the axle A and wheels D, constructed, operating, and arranged as and for the purposes set forth.

FRANK O. WENELL.

Witnesses:
THOS. H. HUTCHINS.
A. F. PATRICK.